(12) United States Patent
Thiele

(10) Patent No.: US 7,028,307 B2
(45) Date of Patent: Apr. 11, 2006

(54) DATA MANAGEMENT FRAMEWORK FOR POLICY MANAGEMENT

(75) Inventor: Karl Thiele, Cary, NC (US)

(73) Assignee: Alcatel, Paris (FR)

( * ) Notice: Subject to any disclaimer, the term of this patent is extended or adjusted under 35 U.S.C. 154(b) by 693 days.

(21) Appl. No.: 10/003,904

(22) Filed: Nov. 1, 2001

(65) Prior Publication Data

US 2002/0069267 A1 Jun. 6, 2002

Related U.S. Application Data

(60) Provisional application No. 60/246,264, filed on Nov. 6, 2000.

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/313; 709/223

(58) Field of Classification Search ........ 719/311–320, 719/328–330, 310; 709/223–226, 229–230
See application file for complete search history.

(56) References Cited

U.S. PATENT DOCUMENTS

2001/0056481 A1* 12/2001 Hayball et al. ............. 709/223

FOREIGN PATENT DOCUMENTS

EP 0 810 799 A 12/1997
EP 0 909 058 A 4/1999

OTHER PUBLICATIONS

Novell ManageWise; 2.7 Management Services product flyer; 2000; 2 pp.
Solstice Enterprise Manager 3.0; product overview; Sun Microsystems Solaris; 1998; 2 pp.
Orchestream Service Activator; Switching on new network services; 6 pp.
hp OpenView extensible SNMP agent product brief; Jun. 2001; pp. 1-3.
Goncalves, Paulo Roberto, Bosco, Joao, and Sobral, Mangueira, "Telecommunications Services Management with Computational Reflection, Using COBRA and JAVA," Telecommunications Symposium 1998, Its '98 Proceedings, SBT/IEEE International SAO Paulp, Brazil, Aug. 9, 1998, pp. 486-491, New York, NY., USA, IEEE, US, ISBN:0-7803-5030-8.

(Continued)

*Primary Examiner*—Meng-al T. An
*Assistant Examiner*—Diem Cao
(74) *Attorney, Agent, or Firm*—Craig A. Hoersten; V. Lawrence Sewell

(57) ABSTRACT

A data management framework for a data communications network. The framework includes a dynamically constructed model of elements of the data communications network. The elements are represented as object instances that are self-descriptive. The model provides a uniform application programming interface that allows a client to dynamically access the elements and dynamically add new elements in performing network management functions. The data management framework may be used for policy management.

11 Claims, 2 Drawing Sheets

OTHER PUBLICATIONS

Weinstock, Johnathan and Tewari, Rajiv, "An object-oriented approach to the management of distributed application systems," Computer Networks and ISDN Systems, Dec. 15, 1997, pp. 1869-1879, vol. 29, No. 16, North Holland Publishing, Amsterdam, NL., ISSN: 0169—7552.

Merle, Phillippe, Gransart, Christophe, and GEIB, Jean-Marc, "CorbaWeb: A generic object navigator," Computer Network and ISDN Systems, May 1, 1996, pp. 1269-1281, vol. 28, No. 11, North Holland Publishing, Amsterdam, NL., ISSN: 0169-7552.

* cited by examiner

DATA MANAGEMENT FRAMEWORK FOR POLICY MANAGEMENT

CROSS-REFERENCE TO RELATED APPLICATION

This application claims the benefit of U.S. Provisional Application No. 60/246,264 filed on Nov. 6, 2000, the content of which is incorporated herein by reference.

FIELD OF THE INVENTION

This application relates generally to network management frameworks, and more particularly to a data management framework that provides a meta-model for expressing a network and relationships between entities in the model in a dynamic manner.

BACKGROUND OF THE INVENTION

Policy management is the application of abstract policies to control the services provided by a network switch. Policy is the association of conditions and actions, based on the attributes of the switch, that enforce certain behaviors in the switch, resulting in a specific service.

Because of the complexity and ranges of values for switching attributes to enforce specific services, the switching attributes need to be organized in a form that can be effectively supported on the network elements involved in the delivery of the services. Although network management system (NMS) solutions exist in the prior art which could be used for policy management, these solutions are undesirable because they generally map their concept of a network into statistically constructed virtual information stores, referred to as managed information bases (MIB). This mapping is often accomplished either through translators that translate an input of some modeling language such as, for example, ASN.1 (Abstract Syntax Notation One), or by hand coding all statistically typed model elements, data, and behavior.

Existing network management architectures therefore do not employ dynamic loading of element definitions and runtime interrogation of types, nor do they generally use descriptive meta-data information to elicit specific behaviors and configuration of network modeling based on typing information. Furthermore, current architectures usually bind network management to typing the entire framework with respect to protocol, allowing the framework and model to represent, for example, ATM but not IP, carrier voice but not data, and IP/ATM enterprise but not carrier ATM/frame relay.

Accordingly, there is a need for a network management framework that provides a meta-model for expressing a network and relationships between entities in the model in a dynamic matter. The network management framework should allow data representations and behavior, topology relationships, and application services including policy management services, to be dynamically assembled into a manageable model of a network without restrictions as to typing, size, growth, and/or performance.

SUMMARY OF THE INVENTION

In one embodiment, the present invention is directed to a data management framework for a data communications network including a client and a server in communication with the client. The server provides a dynamically constructed model of elements of the data communications network. The model provides a uniform programming interface for allowing the client to dynamically access the elements and dynamically add new elements in performing network management functions.

In another embodiment, the present invention is directed to a data management framework for a data communications network where the data management framework includes an application service providing application functions for the network, a modeling tool for creating a dynamic model of elements associated with the application service, and a uniform programming interface providing dynamic access to the elements for performing network management functions.

In a further embodiment, the present invention is directed to a data management framework for policy management where the data management framework includes a dynamically constructed model of a plurality of policy-related elements. The model provides a uniform programming interface for allowing dynamic access of the policy-related elements and dynamic addition of new policy-related elements in performing network management functions.

In another embodiment, the present invention is directed to a method for data management in a data communications network. The method includes the steps of providing an application service for the network, creating a dynamic model of elements associated with the application service, and providing a uniform programming interface for providing dynamic access to the elements for performing network management functions.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION OF THE SPECIFIC EMBODIMENTS

Figure 1:
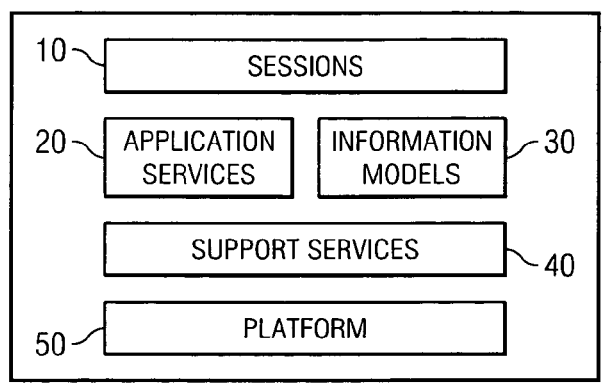
FIG. 1 is a schematic block diagram of various layers of a data management framework used for dynamically creating a network information model according to one embodiment of the invention.

FIG. 1 is a schematic block diagram of various layers of a data management framework used for dynamically creating a network information model according to one embodiment of the invention. Although the layers of the framework illustrated in FIG. 1 are described in terms of various software layers and/or components, a person skilled in the art should recognize that one or more layers of the framework may also be implemented in middleware.

The various layers of the data management framework preferably include a sessions layer 10, application services layer 20, information models layer 30, support services layer 40, and a platform layer 50. The sessions layer 10 preferably provides connection for software systems and/or human users (collectively referred to as clients) for accessing the application services, information models, and/or support services provided by respectively the application services layer 20, information models layer 30, and/or support services layer 40. Preferably, a connection is established via public application programming interfaces (APIs) implemented via CORBA (Common Object Request Broker Architecture), RMI (Remote Method Indication), or other remote interfaces and transport protocols that are conventional in the art. Once a connection is established, a session is preferably created. Sessions preferably control security and user access, log transactions, maintain connection attributes, assist in fault recovery, and the like.

The application services layer 20 includes services that provide application feature functionality, such as, for example, policy management. According to one embodiment of the invention, application services may be dynamically added and associated with features of the network information model as well as to other services provided by the framework.

The information models layer 30 includes information models used to create the data models associated with the application services. Such information models may include conventional models such as, for example, Common Information Model (CIM), Managed Information Base (MIB), or the like. The information models are preferably containers of object instances that collectively model the information and behavior of real entities in a real world management system, such as, for example, a policy management system.

The support services layer 40 provides support technologies for implementing software functionality and operating system services for the data management framework. Support services include protocol stacks, databases, world wide web, graphics, transactions, fault detection/handling, resource management, and/or the like.

The platform layer 50 preferably includes a software operating system and associated hardware for executing the application services in the application services layer 20, including policy management. Preferably, the software operating system is implemented in the JAVA programming language.

Figure 2:
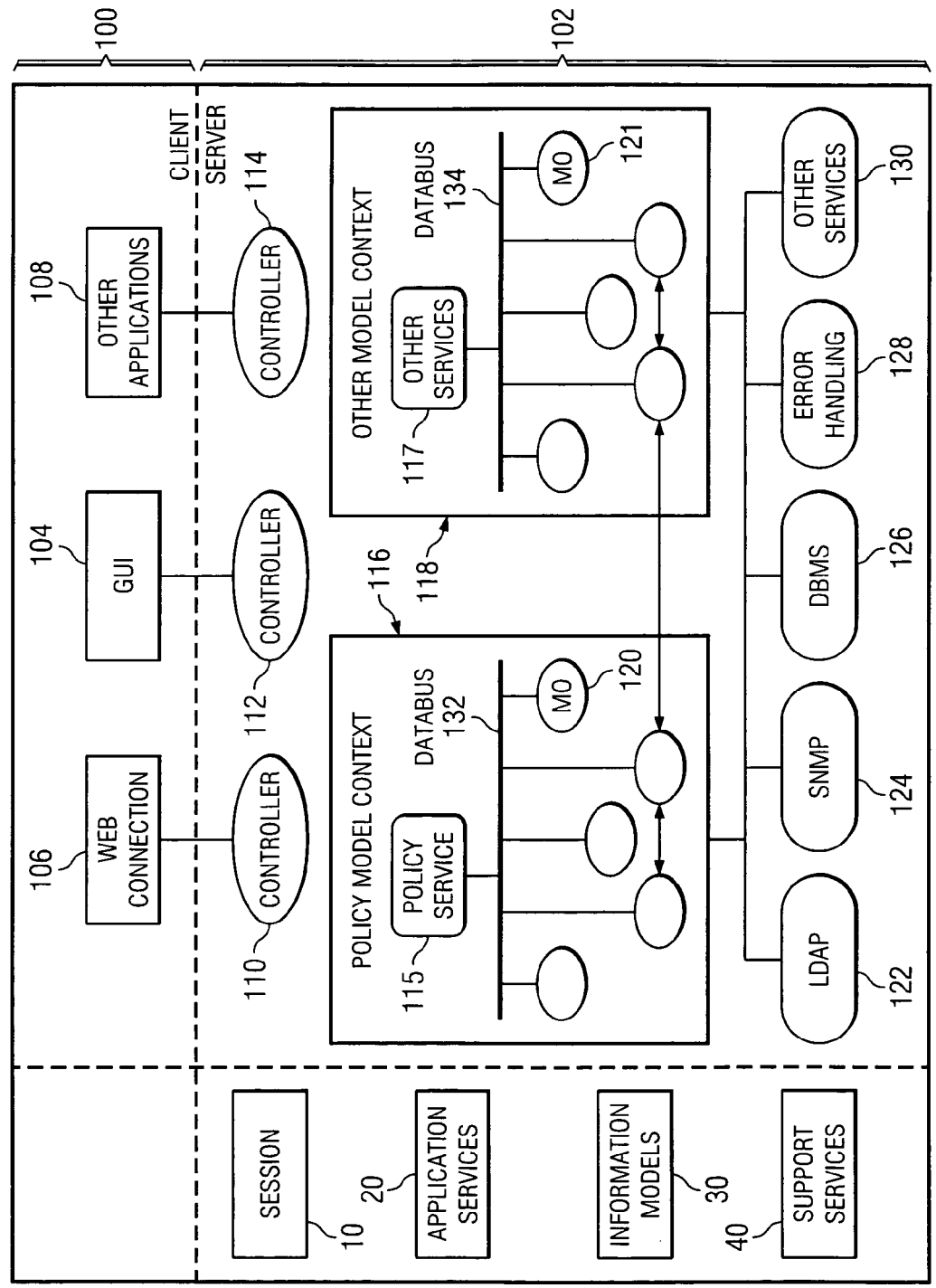
FIG. 2 is a block diagram of various components and modules of the data management framework of FIG. 1 according to one embodiment of the invention.

FIG. 2 is a block diagram of the various components and modules of the data management framework according to one embodiment of the invention. The data management framework is preferably provided by a server 102 in communication with a client 100. The client 100 preferably includes connections from external software to the server 102 via the sessions layer 10. Such connections include graphic user interfaces (GUIs) 104, web connections 106, other application/management systems 108, and the like.

The server 102 preferably provides the sessions layer 10, application services layer 20, information models layer 30, and support services layer 40 of FIG. 1. The server 102 may reside in one processor/computer system or in multiple processors/computer systems. Furthermore, within the context of a single computer, the server 102 may include one or more Java Virtual Machines.

The server 102 preferably provides various controllers 110, 112, 114 within the session layer 10 where each controller controls a connection to the client 100. The controllers may control user access, user profile, transaction auditing, and the like.

The server 102 further provides one or more application services in the application services layer 20 such as, for example, a policy service 115 and other services 117 conventional in a data communication network. The elements of each application service are preferably represented as object instances that are self-descriptive. The object instances are referred to as managed objects (MOs) 120, 121.

A software bus 132, 134 allows the interconnecting of various MOs to each other and to the corresponding application service. The software bus may be implemented, for example, using the InfoBus technology developed by Lotus.

Each MO is preferably an object instance implemented using object oriented programming techniques that includes a definition (class), name, attributes, and relationships with one or more other MOs. The relationship between one more other MOs is referred to as an association. Associations may be named/identified, and include conditions, constraints, and other forms or attributes describing a relationship between the MOs. In the example of policy management, the MOs preferably model different policies, actions, conditions, network elements, directory servers, and other policy driven equipment and software in a network.

The MOs associated with a particular application service belong to a data model 116, 118 constructed using the information models in the information models layer 30. Each data model 116, 118 provides context, or containing environment, in which the MOs reside and interact within software systems and external systems. The data models are also referred to as a model contexts.

Each model context has an application specific functionality and service. Each model context allows control and interaction over the objects inside the container. Any new model context that is introduced or started may discover other model contexts and enlarge the features of the network. Model contexts advertise existence of the contents, publish attributes and behavior, and control access. In this regard, each model context provides a uniform API to the client 100 for interacting with the model context in a dynamic manner. The network to framework path may therefore be described in a dynamic fashion, without static language restrictions or stoppage of processing.

Preferably, each model context exports behavior as a combination of the context's public API, the context's name service, the API of the application services and any attributes or behaviors of the MOs publicly exported. A context has the ability to advertise its attributes, actions and services as well as those of its children. Once advertised, other components may make use of the advertised information.

Each model context 116, 118 that makes up the network information model may run stand-alone or in collaboration with other model contexts. Thus, the entire network information model may be made up of individual models that are distributed, providing scalability and availability to the network management solution.

The application services encompassed by the model contexts 116, 118 preferably utilize the support services in the support services layer 40 in performing their functions. The support services preferably implement the functionality shared by one or more application service. For policy management, the support services may include lightweight directory access protocol (LDAP) databases 122, SNMP 124, database management services 126, error handling 128, and other services 130 such as, for example, auto-discovery, and the like.

Figure 3:
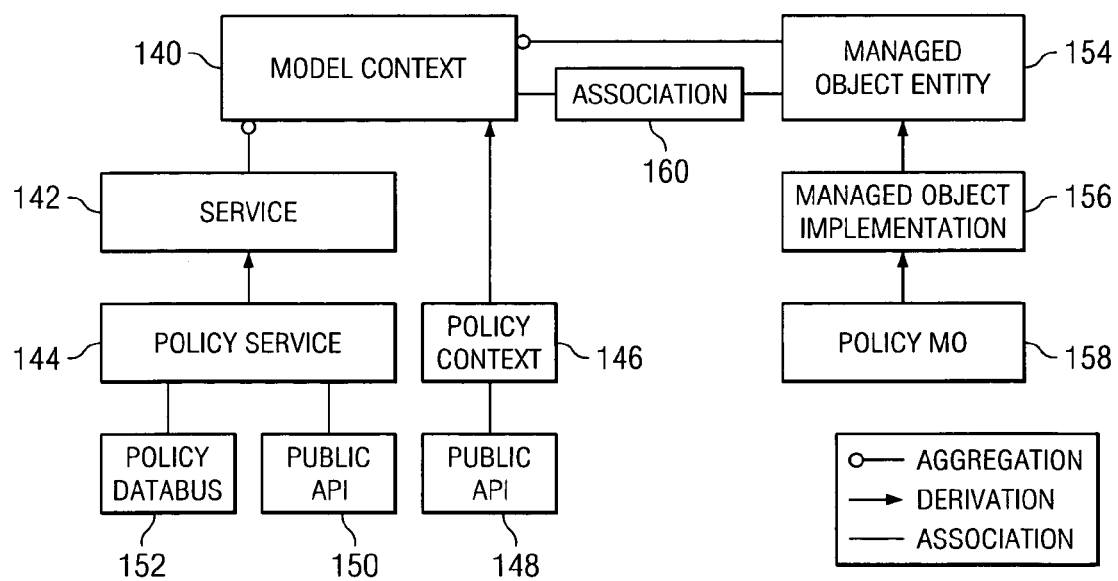
FIG. 3 is an exemplary object oriented diagram of a model context according to one embodiment of the invention.

FIG. 3 is an exemplary object oriented diagram of a model context according to one embodiment of the invention. According to one embodiment of the invention, the model context and its associated components and classes are implemented based on the BeanContext API created by Sun Microsystems, Inc. BeanContext is a pattern which provides a uniform API to access and use a hierarchy of container classes and their children.

A particular model context preferably includes a base class referred to as a model context class 140. The model context class preferably provides default attributes, behavior, and associations for a model context. Model contexts include one or more application services 142, such as, for example, a policy service 144 having a public API 150 and a policy databus 152. A policy model context 146 is derived from the model context class 140. The policy context 146 is associated with the context's public API 148.

Model contexts contain information and behavior represented by MOs. MOs preferably include a base class referred to as a managed object entity (MOE) class 154 and a managed object implementation (MOI) class 156. The MOE class 154 preferably provides default attributes, behavior, and associations for an MO. The MOI class 156 preferably describes how an MO is implemented. For example, the MOI class 156 defines the interface and attributes used to describe the services offered by the MO, or the characteristics of the element represented by the MO. A policy MO 158 is preferably derived from the MOI class.

An MO may be created and reside in only one model context. The MO may have associations with other MOs residing in the same or different model context. An MO is preferably made public outside the context via a naming service or an application service using the application service's API.

An association class 160 preferably expresses a relationship between two or more MOs. The association class 160 preferably includes attributes that describe the qualification, constraints, rules of an association between two or more MOs, allowing other components and tools to operate based on this information.

Although this invention has been described in certain specific embodiments, those skilled in the art will have no difficulty devising variations which in no way depart from the scope and spirit of the present invention. Thus, the present embodiments of the invention should be considered in all respects as illustrative and not restrictive, the scope of the invention to be indicated by the appended claims and their equivalents rather than the foregoing description.

What is claimed is:

1. A data management framework for a data communications network comprising:
   a client;
   a server, the server provides a dynamically constructed model of at least one element of the data communications network, the model providing a uniform programming interface for allowing the client to dynamically access at least one element and dynamically add a new element in performing network management functions;
   the server includes at least one controller communicating with the client;
   a model context;
   a policy context associated with a policy context application programming interface, the policy context derived from a model context;
   the model context including;
      a model context class providing default attributes, behavior, and associations,
      an application service having an application programming interface, and
      a managed object, operatively connected to the application service, and having a managed object entity, wherein the managed object includes a policy managed object derived from a managed object implementation wherein the managed object implementation defines the characteristics of an element, of the one or more elements, that is represented by the managed object and wherein the managed object implementation is derived from the managed object entity wherein the managed object entity provides default attributes, behavior, and associations for the managed object.

2. The data management framework of claim 1, wherein the application service includes a policy service having a public application programming interface and a policy database.

3. The data management framework of claim 1, wherein the managed object is adapted to associated with a plurality of managed objects via an association class; the association class having attributes describing qualifications, constraints, and rules of association between the plurality of managed objects.

4. The data management framework of claim 1, wherein the application service invokes a support service wherein the support service is selected from a group consisting of a lightweight directory access protocol database, a simple network management protocol, a database management service, an error-handling service, and an auto-discoveiy service.

5. The data management framework of claim 1, wherein the application service is a policy management service.

6. A computerized method for data management in a data communications network, comprising:
   providing a client and a sever, the server including at least one controller communicating with the client and a model context having a model context class, an application service having an application programming interface, and a managed object, operatively connect to the application service and having a managed object entity;
   providing, by the model context class, default attributes, behavior, and associations;
   deriving from the model context a policy context, associated with a policy context application programming interface;
   providing, by the server, a dynamically constructed model of one or more elements of the data communications network;
   providing, by the dynamically constructed model of elements, a uniform programming interface for allowing the client, in performing network management flinctions, dynamical access to the one or more elements and dynamical addition of a new element, and
   wherein the steps of
   providing, by the managed object entity, default attributes, behavior, and associations for the managed object;
   deriving a managed object implementation from the managed object entity;
   driving a policy managed object from the managed object implementation; and
   creating, by the managed object implementation, characteristics of an element represented by the managed object, the managed object including the policy managed object derived from the managed object implementation.

7. The method for data management in a data communications network of claim 6, further including the step of dynamically adding a new application service to the sewer via a new model context.

8. The method for data management in a data communications network of claim 6, wherein the application service includes a policy service having a public application programming interface and policy database.

9. The method for data management in a data communications network of claim 6, wherein the managed is adapted to associate with a plurality of managed objects via an association class; the association class having attributes describing qualifications, constraints, and rules of association between a the plurality of managed objects.

10. The method for data management in a data communications network of claim 6, wherein the application service invokes a support service wherein the support service is selected from a group consisting of lightweight directory access protocol databases, simple network management protocol, database management services, error handling, and auto-discovery service.

11. The method for data management in a data communications network of claim 6, wherein the application service is a policy management service.

* * * * *